(12) United States Patent
Wilson et al.

(10) Patent No.: US 6,216,800 B1
(45) Date of Patent: Apr. 17, 2001

(54) IN-SITU DRILLING SYSTEM WITH DUST COLLECTION AND OVERLOAD CONTROL

(75) Inventors: Henry E. Wilson, Ironton; Gregory E. Hinshaw; William S. McIntyre, Jr., both of Proctorville, all of OH (US)

(73) Assignee: J. H. Fletcher & Co., Inc., Huntington, WV (US)

( * ) Notice: Subject to any disclaimer, the term of this patent is extended or adjusted under 35 U.S.C. 154(b) by 0 days.

(21) Appl. No.: 09/198,327

(22) Filed: Nov. 24, 1998

(51) Int. Cl.$^7$ .............................. E21B 3/06; E21B 21/00; C09K 7/00; B25D 17/14; B23Q 5/00
(52) U.S. Cl. .............................. 175/27; 175/213; 175/48; 175/66; 173/3; 173/4
(58) Field of Search ..................................... 175/213, 214, 175/25, 27, 38, 48, 65, 66, 67, 69; 173/2, 3, 4, 11

(56) References Cited

U.S. PATENT DOCUMENTS

| | | | |
|---|---|---|---|
| 2,771,272 | * | 11/1956 | Miller ..................................... 175/38 |
| 2,843,361 | * | 7/1958 | Miller ..................................... 175/38 |
| 2,975,847 | * | 3/1961 | Feucht ..................................... 173/77 |
| 3,324,717 | * | 6/1967 | Brooks et al. ........................... 175/48 |
| 3,613,805 | * | 10/1971 | Lindstad et al. ........................ 175/48 |
| 3,670,826 | * | 6/1972 | Hanson et al. ........................... 173/4 |
| 3,870,111 | * | 3/1975 | Tuomela ................................. 175/27 |
| 3,910,360 | * | 10/1975 | Sundstrom ............................... 173/3 |
| 3,946,818 | | 3/1976 | Ek . |
| 3,968,845 | | 7/1976 | Chaffin . |
| 4,223,748 | | 9/1980 | Barendsen . |
| 4,434,861 | | 3/1984 | Howeth . |
| 4,503,918 | | 3/1985 | Bergkvist et al. . |
| 4,606,415 | * | 8/1986 | Gray, Jr. et al. ....................... 175/24 |
| 4,694,439 | * | 9/1987 | Moll ....................................... 175/48 |
| 4,793,421 | * | 12/1988 | Jasinski ................................. 175/38 |
| 4,848,485 | | 7/1989 | Piipponen et al. . |
| 4,936,397 | | 6/1990 | McDonald et al. . |
| 5,048,620 | | 9/1991 | Maher . |
| 5,121,802 | * | 6/1992 | Rajala et al. ........................... 173/11 |
| 5,129,464 | | 7/1992 | Richier . |
| 5,253,961 | | 10/1993 | Geissler . |
| 5,320,188 | | 6/1994 | England . |
| 5,348,107 | | 9/1994 | Bailey et al. . |

(List continued on next page.)

Primary Examiner—Brian L. Johnson
Assistant Examiner—Joselynn Y. Sliteris
(74) Attorney, Agent, or Firm—King and Schickli, PLLC

(57) ABSTRACT

An apparatus and method is provided for substantially continuously drilling and disposing of drill cuttings and dust to minimize airborne contamination while providing protection against overload. A drill stem with a bit is advanced by a drill head to form the drill hole. A flushing mechanism utilizes vacuum or pressurized water for flushing the cuttings and dust from the drill hole for disposal. A transducer monitors the negative or positive gauge pressure. A controller is utilized to regulate the rate of drilling dependent on the signal level of the pressure being monitored. In the preferred embodiment utilizing air, the passage in the drill stem removes the cuttings/dust and is connected to a transfer duct, which in turn is connected to a filter and the intake side of a blower. The controller is programmable to establish the optimum rate of feed of the drill head. The rotary motion of the drill bit can also be regulated by the controller. Preferably, the threshold level to determine an approaching overload is in the range of 10% to 20% over the normal gauge pressure of 0.5–4 inches Hg. The feed of the drill stem and/or the rotation is slowed or stopped in an approaching overload condition, and automatically reestablished once the condition is past. In the alternative embodiment, the pressurized water flows through the passage in the drill stem and bit forming a slurry with the cuttings/dust. The slurry flows around the drill stem/bit and is deposited outside the drill hole.

20 Claims, 2 Drawing Sheets

U.S. PATENT DOCUMENTS

| | | |
|---|---|---|
| 5,409,072 | 4/1995 | Enlund et al. . |
| 5,425,188 * | 6/1995 | Rinker ................................... 175/66 |
| 5,449,047 * | 9/1995 | Schivley et al. ....................... 173/11 |
| 5,465,798 * | 11/1995 | Edlund et al. ......................... 175/27 |
| 5,699,261 * | 12/1997 | Muona ................................... 175/24 |
| 5,746,278 * | 5/1998 | Bischel et al. ......................... 175/48 |
| 5,771,981 * | 6/1998 | Briggs et al. .......................... 173/11 |
| 5,844,133 * | 12/1998 | Goto et al. ............................. 175/24 |
| 5,913,371 * | 6/1999 | Jenne ..................................... 175/27 |
| 5,944,121 * | 8/1999 | Bischel et al. ......................... 175/48 |
| 6,029,754 * | 2/2000 | Kattentidt et al. ..................... 175/27 |

* cited by examiner

IN-SITU DRILLING SYSTEM WITH DUST COLLECTION AND OVERLOAD CONTROL

TECHNICAL FIELD

The present invention relates to an improved system for in-situ drilling, and more particularly, to such a system where the rate of drilling is regulated by monitoring one or more parameters of the fluid flow for disposing of the cuttings and dust.

BACKGROUND OF THE INVENTION

Most earth drilling systems employ some form of rotary or percussion powered drills. There have been many advances in recent years to make the drilling operation more efficient, and thus provide better and faster drilling speeds, especially in rock layers. Typically, a drilling machine, such as for forming a hole for an explosive charge, or for anchoring a roof bolt, includes a drill stem with a drill bit on the distal down hole section thereof. The stem/bit on a rotary drill machine is rotated by a spinner mounted on a drill head to form the drill hole. The rotary driving motion of the spinner is usually hydraulically or pneumatically driven and manually regulated by the operator of the drill machine. Due in part to the advances in the technology, such as in regard to the drill bit and/or components of the drilling machine, providing attendant easier and faster drilling, operators have become accustomed to set the controls to try to drill the hole in the least amount of time. In doing so, the spinner head is rotated and the feed of the drill head is engaged to move the drill stem into the hole as rapidly as possible. The operator typically changes these settings only in the event that a problem develops.

As a part of the more efficient drilling, the cuttings and dust must be collected and removed from adjacent the drill bit so that clean cutting edges are provided at the bottom of the hole to allow the most efficient contact with the rock, or other strata. Typically, a pneumatic or hydraulic cuttings/dust collection/suppression and removal system is employed. Pressurized air, or a suitable hydraulic fluid such as water, or an air/water mixture, is forced down a center passage through the drill stem to bail or pick up the cuttings and dust for disposal. It is also known to impose a vacuum on the center passage of the drill stem drawing air into the hole around the periphery of the drill stem, whereupon the cuttings and the dust particles are entrained and removed through the center passage. In either system, this withdrawn debris is pneumatically or hydraulically conveyed away from the drill hole. When using air, the cuttings and dust are then filtered out at a remote location and disposed of. In systems where water is used, either exclusively or in a mixture with other fluids, an option is to simply allow the dust to be suppressed and then deposited outside the drill hole. In either case, airborne contamination is advantageously substantially eliminated.

A typical drilling arrangement and cuttings/dust collecting system is shown in the prior art; Howeth, U.S. Pat. No. 4,434,861. In this patent, the bailing air is supplied through the center passage of the drill stem and the cuttings/dust is removed from the hole by a vacuum head. Insofar as the '861 disclosure is concerned, the advancement of the drill stem into the hole, and the rotation of the drill bit, are manually controlled by the operator. Other functions of the drilling system are however automatically controlled, such as the extending or retracting the drill stem with respect to the deck plate. In other words, the drill stem extends to the drilling position only when the drill stem is supplied with sufficient bailing air to be operative, and the drill stem is automatically retracted from the hole when the bailing air supply is terminated (see column 14, lines 14–37).

Another feature of the prior art Howeth '861 patent is to provide an improved vacuum skirt around the hole and the drill stem so as to attempt to improve the sealing, and thus enhance the efficiency of the bailing operation by reducing the tendency of the bailing system to choke or overload. This patent also teaches the fundamental premise of making certain that the passageways are proportioned sufficiently larger than the drill hole to also help alleviate choking of the bailing air carrying the cuttings/dust (see column 14, lines 38–66). While this overall system is an improvement over prior art drilling machines, problems still arise with regard to choking or overloading the vacuum system, especially where the drill speed is increased beyond normal levels and when strata containing soft minerals, coal, shale, mud stone or the like debris are encountered in the drilling operation.

Other patents, such as the patent to Ek, U.S. Pat. No. 3,946,818, have disclosed other efforts of inventors to improve the sealing of the skirt in a different manner to try to improve the flow so that choking does not occur as readily. Heretofore, approaches other than these stop gap methods to solve the same problem have simply not been successful, insofar as we are aware. In theory, the operator of the drilling machine is simply depended upon to try to anticipate any approaching choking or flow overload situation and then shut the machine down. Unfortunately, in an overwhelming percentage of times, this is not possible because of the response time factor, and the collecting system becomes overloaded. The entire drilling operation must then be shut down for an extended period, the drill stem and bit removed from the drill hole and all passageways cleared of the debris. Alternatively, drilling must be performed at a continuously reduced rate to compensate and thus prevent these intermittent overload conditions.

Other inventors have concentrated on improving other aspects of the drilling machines, such as with respect to an improved cyclone filter, as set forth in the England U.S. Pat. No. 5,320,188. Indeed, there have even been attempts to control the flow of pneumatic fluid to the drilling tool in an automatic fashion. In the McDonald et al. U.S. Pat. No. 4,936,397, the pneumatically controlled valve is operable to transmit an initial, extra strong pulse of air to initiate operation of the down hole drilling motor. Once the motor is operating, the valve is kept open at a lower pressure than is required to open it so that the drilling can continue at a lower energy level.

Similarly, energy saving is the impetus in the Enlund et al. U.S. Pat. No. 5,409,072, wherein the pneumatic air supply is provided by a compressor driven by a hydraulic drive motor with adjustable displacement. The pneumatic pressure supplied by the compressor is adjusted inversely proportional to the pressure primarily used to drive the percussion drill along its linear path, and/or the input pressure of the drive motor itself. In this manner, it is proposed that the energy required to operate the entire system is maintained substantially constant during all phases of the operation.

Thus, while many refinements have been made in drilling machines and their method of operation, there is a marked absence of more responsive control systems, and more particularly with regard to regulating the drill feed and rotation in response to one or more parameters occurring in the cuttings/dust collecting or suppression system. Such a concept would have specific usefulness in improving the drilling efficiency especially for forming small (20–50 mm)

diameter holes using rotary cutting tools and high tool feed forces. In such an arrangement, we have discovered that it would be especially advantageous to keep the drill penetration rate as rapid as possible, while at the same time control the rate of tool advance and/or rotation using feedback from the cuttings/dust collection or suppression system. In this manner, it is believed that clogging or overload, and its deleterious side effects, can be avoided. What we envision as a need in the underground mining industry, and particularly for drilling small diameter holes for installation of roof bolts, explosive charges or the like, is such an automatic control, but through a system that is simple in design and operation.

Accordingly, it is a primary object of the present invention to provide an improved in-situ drilling system, and related method having a control system for maximizing drilling efficiency, primarily by preventing overload through efficient removal of the cuttings/dust for collection or suppression by means of a flushing mechanism, and in addition, substantially eliminating airborne dust contamination.

It is another object of the present invention to provide a highly efficient design for such a system and one that is effective in operation to anticipate overload by sensing a change in an operating parameter in the flushing mechanism.

It is another object to provide a drilling system that makes a provision to sense a parameter of the fluid used for removal of cuttings and dust, and then through a feed back signal to a controller regulate the feed rate of the drill head and/or the rotation of the spinner.

It is still another object of the present invention to provide such an apparatus and its method for providing substantially continuous in-situ drilling, wherein the drill cuttings and dust are removed from the drill hole, and either collected and disposed of or suppressed in a highly efficient manner, with control being dependent upon the change in pressure, flow or other parameter in the flushing mechanism, so that the drill stem and drill bit are maintained in an optimum operating mode.

Still another object of the present invention is to provide a drilling system wherein an approved, low power control circuit is utilized with a programmable controller to monitor the negative or positive gauge pressure in the fluid flushing mechanism, and provide a responsive signal to the feed device for the drill head and/or the rotary drive of the drill stem to efficiently control the drilling operation to virtually eliminate downtime due to clogging or overload.

Yet another object of the present invention is to provide an apparatus and method of the type described wherein the controller is programmable to allow adjustment of the approaching overload, and other conditions of the drilling operation.

It is still another object of the present invention to provide a drilling system utilizing a feed device for the drill head and a rotary spinner for driving the drill stem and the drill bit, and wherein the rate of feed of the drill head and/or drill rotation is effectively controlled based on the level of a sensed parameter of the fluid flushing mechanism so as to detect an approaching overload condition, whereby drilling system downtime is avoided.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects of the invention, and in accordance with the purposes thereof, an improved apparatus and method for controlling the operation of a drill stem and drill bit based on monitoring the status of the fluid flushing mechanism is provided. More specifically, the apparatus provides for substantially continuous in-situ drilling, collecting and disposing or suppression of the drill cuttings/dust by feedback of the level of negative or positive gauge pressure maintained in the flushing mechanism through a programmable controller. The control circuit is preferably a low power (4–20 ma) electronic circuit that is approved for all underground mines. Alternatively, a hydraulic or electro-hydraulic circuit providing a comparable function is contemplated. The inventive system is targeted primarily for small (20–50 mm) holes in virtually any type of mining operation, including soda ash, coal, trona, salt, potash, limestone, gypsum or the like.

In this preferred embodiment for carrying out this principle, there is provided a drill stem having a drill bit, a drill head for feeding the stem/bit to form the drill hole, a mechanism for flushing the cuttings/dust from the hole and conveying it to a remote location. A transducer tracks at least one parameter of the flow in order to provide a signal to the controller for regulating the rate of drilling so as to anticipate an approaching overflow condition. By utilizing such a system, the cuttings/dust and other debris are efficiently removed to eliminate or minimize airborne contamination. This objective is accomplished in a controlled manner without ever reaching an overload condition in the flushing mechanism that could lead to clogging and downtime of the drilling system.

Also, in the preferred embodiment the parameter is sensed through the transducer coupled to a transfer duct of the flushing mechanism. The feedback arrangement provides for a corresponding signal to be generated by the transducer indicative of the pressure in the duct. In return, the controller is operative to regulate the operation of the feed device for the drill head to vary the rate of feed dependent on the signal level. In addition, the drive unit for rotating the drill stem/bit can be controlled in concert with the feed.

Given the objective requirement for simplicity, the flushing mechanism includes for vacuum generation a standard blower connected to the transfer duct through a standard filter. The filter may include tortuous path, cylinder cartridges and/or cyclone filters. The filters are periodically emptied/cleaned to dispose of the larger particles of the cuttings, as well as the smaller dust particles.

The controller can be used to program and adjust the threshold of the approaching overload so that maximum drilling efficiency is obtained for any particular mining, or related operation, being performed. The window of operation is set to insure substantially continuous drilling and eliminate false signals of approaching overload. The upper and lower thresholds of the gauge pressure in the flushing mechanism can be varied to establish the optimum rate of feed and/or drilling rotation.

In an alternative embodiment, the flushing mechanism utilizes pressurized fluids, such as including water, that is pumped through the center passage of the stem/bit. A slurry of cuttings/dust is formed and forced out of the drill hole for easy disposal, while in effect suppressing the dust to eliminate airborne contamination. Any increase in positive gauge pressure is sensed through the transducer in the transfer duct to anticipate any approaching overload condition. As in the preferred embodiment, corrective adjustment is automatically made in the drilling rate.

With respect to the related method of the present invention, the in-situ drilling and collecting or suppressing of the drill cuttings and dust from the drill hole includes the steps of drilling the hole with a drill stem and bit, flushing the cuttings/dust from the drill hole, monitoring at least one parameter of the flow of the bailing fluid, and regulating the rate of drilling to control the parameter during both a normal and approaching overflow condition. By use of this method, the drilling operation can be continuous as the collection or suppression of cuttings and dust from the drill hole is carried out in a controlled manner.

In accordance with the preferred version of the method, the parameter being monitored is the vacuum or negative fluid pressure level in the flushing mechanism. The regulating step is preferably concerned with the rate of feed of the drill stem into the drill hole. That is, the feed rate, including from zero to maximum, is made dependent on the signal level of the negative gauge pressure sensed in the transfer duct during the step of collecting and conveying the cuttings/dust or otherwise suppressing the dust. As an additional feature, the use of a programmable controller, or an equivalent adjustable operating hydraulic or electrohydraulic valve, allows the addition of the step of adjusting the threshold of the approaching overload of the flushing mechanism for maximum efficiency. Also, adjustment of the reset window of the gauge pressure is contemplated. Close control of the threshold and the reset window helps in establishing the optimum rate of feed for the drill to stem and thus the drilling efficiency. In more specific terms, in the case of vacuum flushing, the adjusting step is performed by setting the threshold level of the vacuum/negative gauge pressure in the range of 10% to 20% above the normal negative pressure level, and to reset to normal vacuum within 0.5–4 inches Hg. as the threat of the overload is passed. If desired, the regulating step can include changing the speed of the rotary driving of the drill stem, also depending on the signal level from the transducer and coordinated with the linear feed rate of the drill stem.

Thus, under optimum operating conditions, the regulating step can perform so as to maintain the parameter in the flushing mechanism, such as the vacuum level or rate of flow of the fluid, so as to be substantially constant. Also, while the regulating step, as controlled by the programmable controller, can be made to vary the drill head feed and the spinner rotation, the preferred embodiment at present is to actually stop the feed of the drill stem and/or the spinner during an approaching overload condition, and to automatically restart the feed/rotation at the optimum rate when the potential or threatened overload condition is past.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated and forming a part of the specification, illustrates several aspects of the present invention, and together with the description serves to explain the principles of the invention.

Reference will now be made in detail to the present preferred embodiment of the invention, an example of which is illustrated in this drawing.

DETAILED DESCRIPTION OF THE PREFERRED EMBODIMENT

Figure 1:
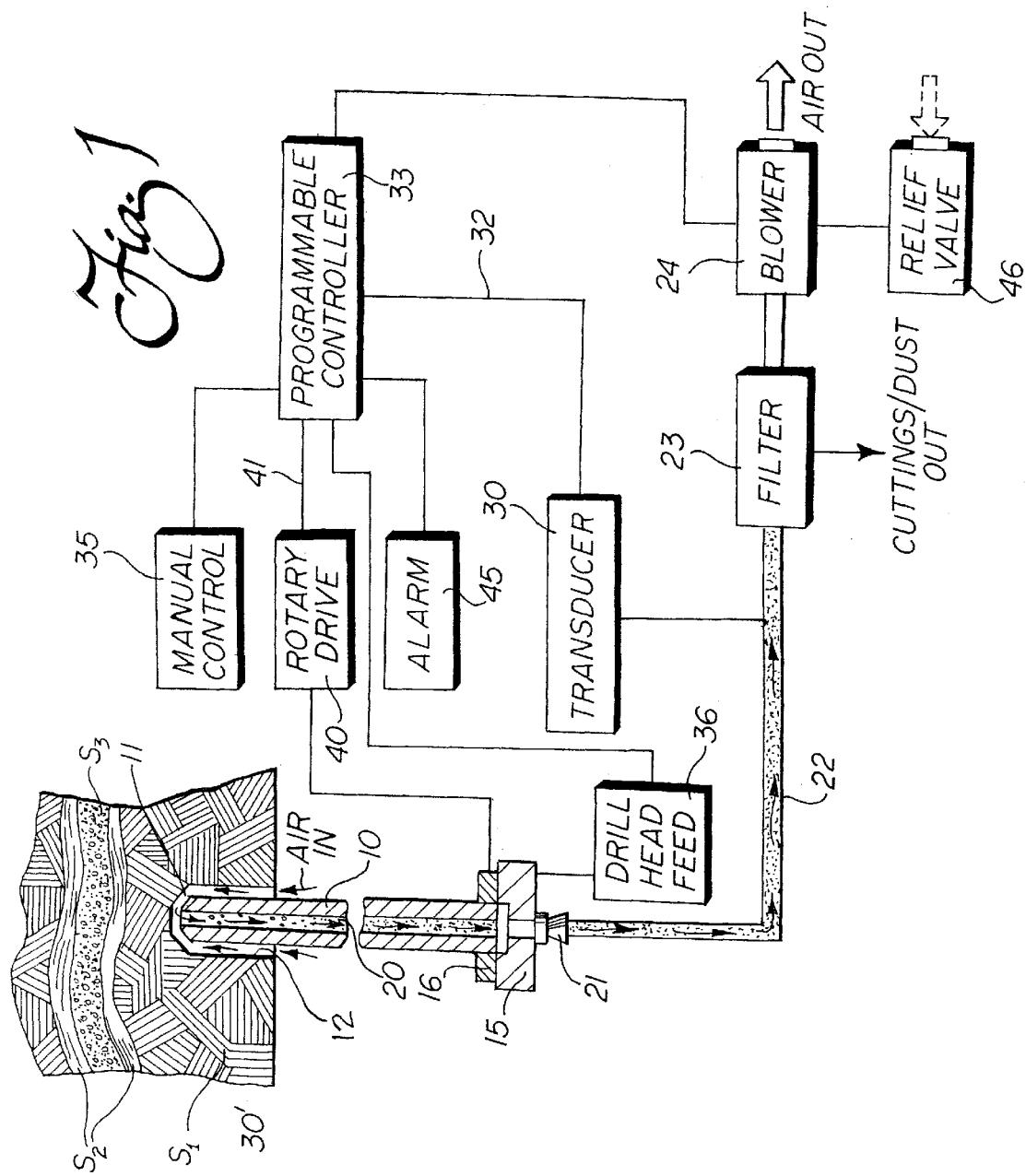
FIG. 1 is a schematic diagram of the drilling system of the present invention, including its preferred flushing mechanism and control circuit, and as applied to a rotating drill stem/bit for forming a drill hole in the earth having variable strata.
Figure 2:
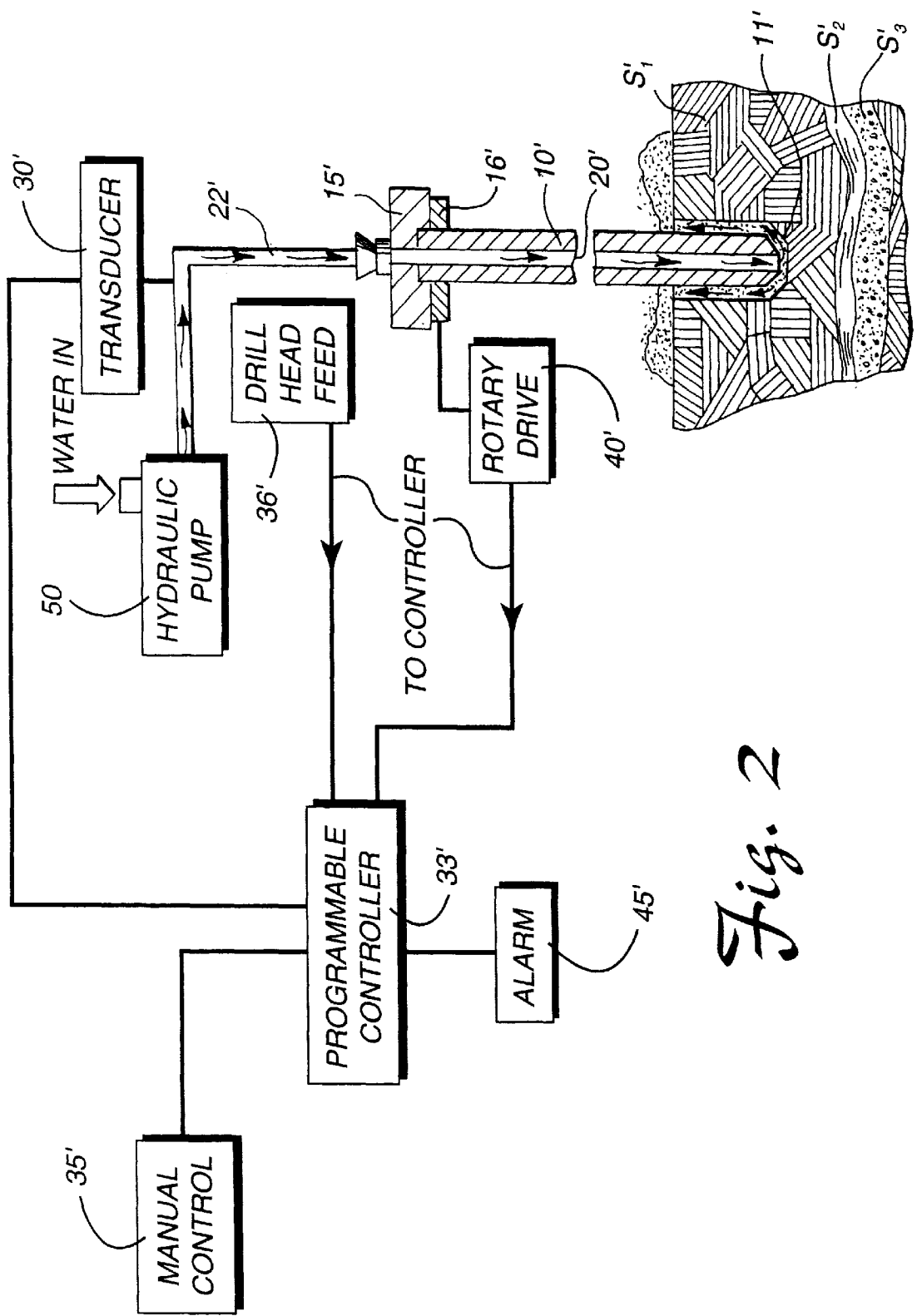
FIG. 2 is a similar schematic diagram of the alternative embodiment using a pressurized hydraulic fluid for flushing the drill hole for suppression of the dust, rather than a vacuum for flushing and remote disposal.

With reference now to FIGS. 1 and 2 of the drawing, an in-situ drilling system is illustrated that represents in a graphical fashion the important aspects of the present invention, both in the apparatus and method form, and in the preferred and alternative embodiments. The particular representation of the preferred FIG. 1 embodiment is typical of drilling in a mine roof having rock strata $S_1$ forming the ceiling of a mine. Additional overburden includes representative seams of mud $S_2$ and soft rock/mineral or gravel $S_3$; it being understood as pointed out above that this representation is merely one environment in which the drilling system of the present invention can be utilized. A drill stem 10 with a drill bit 11 formed on the distal, down hole point of the stem is forming a drill hole, such as for placement of a roof bolt (not shown). The drill stem 10 is fed into the hole by force supplied by drill head 15, and the rotation to cause the drill bit 11 to cut the rock is provided by a rotary spinner 16. While this representative embodiment features a rotary drill, it is to be understood that in accordance with the broadest aspects of the invention, other forms, such as percussion drilling could be used. Also, in the drilling system of the present invention, the preferred range of the diameter of the drill hole is 20–50 mm; however, it is to be understood that other size holes can also be drilled using the same principles. Of course, in addition to drilling in overhead strata, the system of the present invention could be used in a side wall, or in the floor of any earth strata, as represented in the alternative embodiment of FIG. 2, and for other purposes, including placement of explosive charges and the like.

The drill stem 10 and the drill bit 11 include a central passage 20 and the proximal end includes a coupling 21 for connection to a transfer duct 22. A filter 23 is positioned in the transfer duct to collect the cuttings and the dust formed by the drill bit 11 cutting into the rock (see upstream particle representations in the drawing). Downstream, a blower 24 with the intake side connected to the filter 23 establishes the vacuum or negative gauge pressure through the filter 23, the transfer duct 22 and the drill stem/bit 10, 11. These components together form a preferred embodiment of a flushing mechanism for the cuttings/dust that is bailed and removed from the bottom of the drill hole 12. As will be apparent, the bailing air flow established by the vacuum in the transfer duct 22 enters through the annular opening around the drill stem 10 and drill bit 11, picks up and removes the cuttings/dust particles and conveys the same to the filter 23 at a remote location. Periodically, the filter 23 is emptied and cleaned allowing the cuttings/dust to be disposed of.

In accordance with an important aspect of this preferred version of the present invention, a vacuum or negative gauge pressure transducer 30 is tapped into the transfer duct 22 to monitor this parameter of the flow of the cuttings and dust. While the transducer 30 is the preferred component for monitoring the flow, other sensors could be substituted for monitoring different parameters, such as for example the actual flow rate of the bailing air as it passes through on the way to the filter 23. The transducer 30 provides an output signal over line 32 that represents the parameter being monitored in the transfer duct 22. A programmable controller 33 receives the signal and in a manner as will be more apparent in the description below, provides for regulating the rate of drilling by the drill bit 11.

The controller 33 is programmed to establish a normal drilling rate, and as long as the drill bit remains in the same rock strata $S_1$, this condition is not changed. However, upon entry into another type of strata, such as the soft mud strata $S_2$, the soft rock/mineral/gravel strata or other debris $S_3$, a controlled change is automatically made in accordance with the present invention. To do this, the controller 33 is connected by signal line to a drill head feed device 36, which as shown acts to apply linear force against the drill head 15. A pneumatic or hydraulic power source (not shown) provides this force that simply acts to push the drill head 15 into the drill hole 12 at a substantially constant rate. The constant rate continues until the drill bit 11 breaks through to the softer stratas $S_2$, $S_3$, at which time the threat of overload of the flushing mechanism 20-24 occurs.

According to the principles of the present invention, the controller 33 through the transducer 30 senses this approach of the overload condition, and in response reduces the rate of feed supplied by the feed device 36. With the feed rate thus reduced, the passage 20 and the flushing mechanism 20-24 can recover by increasing the percentage of bailing air with respect to the mud/soft rock/gravel or the like that suddenly is entering through the passage 20. As a result, choking or overload of the flushing mechanism 20-24 is avoided and the operation of the drilling system can continue as programmed in the most efficient manner.

To explain further, in the past prior to the present invention, the soft strata material, especially if wet, would immediately tend to clog the passage through the stem/bit. When an adjustment is not made, the vacuum system in general, and any flushing mechanism in particular, could not remove the cuttings/dust fast enough to prevent solid plugging. When this occurs, the drill bit is isolated from the distal cutting face of the hole by the debris so that effective drilling cannot continue. Furthermore, such plugging as has occurred often in the past, requires costly downtime for removal of the stem/bit from the hole and tedious cleaning of the entire flushing mechanism.

The controller 33 can be programmed in any suitable manner, such as through a manual control 35, and more specifically a key board. The rate of movement of the drill stem/bit 10, 11 being forced by the feed device 36 into the drill hole 12 can be regulated to slow to the degree necessary to allow the level of vacuum in the transfer duct 22 to recover to a safe, lower negative gauge pressure once the threat of overload has passed. However, a preferred, and broadly equivalent embodiment for the purposes of explaining the present invention, the forward advance of the feed device 36 is stopped during the regulation step. The controller 33 can set the threshold level at any desired point in order to safely anticipate the overload condition, and thus stop the feed in time to prevent the deleterious choking and clogging of the system that would otherwise require time consuming and expensive shutdown.

Typically, the vacuum or negative gauge pressure is set at a threshold level of approximately 10–20% higher than the normal operating level of 10–18 inches Hg. This advantageously establishes the overall optimum rate of feed since the point of overload is never reached in practice. The reset level of the negative pressure is in the range of 0.5–4 inches Hg. These typical ranges do vary for different types of mines, or other applications, where the strata and operation conditions can vary significantly.

The controller 33 is also preferably connected to rotary drive unit 40 over signal line 41 that is connected to the spinner 16. As with the feed device 36, the drive unit 40 is understood to be connected to a power source, either pneumatic or hydraulic, in order to rotate the spinner 16. In addition to stopping or slowing the drill head feed, within the broadest aspects of the present invention the same and/or complimentary effect of preventing overload of the flushing mechanism 20-24 can be accomplished by coordinated regulating the speed of the spinner. In other words, by reducing the rotation of the drill bit, the amount of cuttings/dust and debris can be reduced instantaneously upon sensing a rise in the negative gauge pressure, thus giving the flushing mechanism time to recover to normal, lower negative pressure levels. Of course, as mentioned above, rather than a rotary drill, within the broadest aspects of the invention a percussion or other type drill can be used and drilling rate regulated.

The controller 33 can also activate an alarm 45 for the benefit of the operator of the roof bolting or other machine, that incorporates the drilling system of the present invention. Also, as a precaution, a relief valve 46 can be provided on the blower 24 in order to prevent excessive vacuum from being generated in the unlikely event of a catastrophic overload occurring.

In the alternative embodiment of FIG. 2, the key difference is the substitute of a hydraulic pump 50 for the blower 24, and pressurized water or other hydraulic fluid is used for flushing, instead of the vacuum and air. As illustrated, the like components are designated by the same reference numerals but including a prime designator. As is clear, the pressurized water (including water/air mixture, if desired) from pump 50 is forced through the transfer duct 22' and through the passage 20' of the stem/bit 10', 11'. A slurry of cuttings/dust is formed, forced out of the drill hole around the stem/bit and deposited on the floor. The dust that would otherwise provide airborne contamination is suppressed due to the wet condition of the slurry. The controller 33' in response to the positive gauge pressure monitored by the transducer 30' controls the feed device 36' and/or the drive unit 40' in the event that the back pressure signals an approaching overload due to clogging by debris, such as from the strata $S_2'$, $S_3'$. An alarm 45' signals the operator of the overload condition.

The related method of the present invention for in-situ drilling and flushing of the drill cuttings and dust includes the steps of drilling the hole with the drill stem/bit 10, 11 or 10', 11', feeding the same into the earth by the feed device 36, 36' acting on the drill head 15, 15' as the bit 11, 11' is effective to form the hole, flushing the cuttings/dust by bailing fluid flow through the flushing mechanism 20-24; 20', 22', 50, monitoring at least one parameter of the flow, such as negative or positive gauge pressure, and regulating the rate of drilling through the controller 33, 33' by a feedback signal to avoid an approaching overload condition if it occurs. As a result of this method, the cuttings/dust are collected or suppressed in a controlled manner, and in a substantially continuous drilling operation, providing for increased efficiency in any roof bolt/explosive charge installation, or related drilling operation.

In the preferred method, the parameter being monitored is the level of vacuum in the bailing air flow through the transfer duct 22. Once the vacuum level is raised due to an approaching overload condition, the feed of the drill head 15 is advantageously stopped, or reduced proportionally to the requirement that is sensed, in response to the rise in the vacuum/negative gauge pressure level. At any time, the particular threshold level where the feedback signal stops or reduces the feed can be reprogrammed through the manual control 35.

In addition, in the illustrated embodiments the regulating step may include stopping or reducing the speed of rotation of the spinner 16, 16' through the rotary drive unit 40, 40' upon sensing an increase in the gauge pressure by the transducer 30, 30' to the threshold level. In this instance, the controller 33, 33' coordinates the speed regulation through the spinner 16, 16' with the feed regulation of the feed device 36, 36' through the drill head 15, 15'. As in all instances of the method, once the potential overload condition is past, the feed and/or rotation of the drill stem 10, 10' and the drill bit 11, 11' is automatically returned to the optimum rate.

The programmable controller 33, 33' preferably includes a PLC or microprocessor that operates in a 4–20 milliamp low power range and approved for all types of mines by MSHA. Indeed, it is contemplated that the controller 33, 33' can be combined with various other sensors of the drilling system being monitored in order to help in regulating the entire drilling operation. As necessary, the operator of the roof bolting machine, or other machine where the drilling system is utilized, can use manual control 35, 35' to override or assist the automatic control of the control circuit of the present invention. However, the most significant advantages are attained by automatically anticipating an overload of the flushing mechanism 20-24; 20', 22', 50, supplying the bailing fluid, and thereby enhancing productivity of the drilling operation. The greatest benefit is in reducing downtime that would otherwise be needed to remove the drill stem/bit 10, 11; 10', 11' and clear the passageways of the flushing mechanism.

When working in soft minerals, such as trona, the negative or positive pressure levels detected in the transfer duct 22, 22' run comparable to drilling through strata of limestone, coal, shale or sand stone, or other debris such as in a coal mine. In other words, the trona as a soft mineral still requires no higher threshold level than in a normal bailing operation. As this feed back signal level is increased, the limiting factor to the speed of forming the drill hole 12 becomes maintaining the flushing mechanism 20-24; 20', 22', 50 of the present invention operating continuously, and the system of the present invention is able to do this. By incorporating the 10–18 inches Hg. operating threshold level, and the 0.5–4 inches Hg. reset window or range, the problem of clogging and the attendant downtime is virtually eliminated in this type of mine operation. Generally, the lower the threshold level and the narrower the reset window, the more efficient operation is attainable. Also, while the threshold/reset control is contemplated as being efficiently handled by the controller 33, 33' equivalent threshold pressure/reset switches can be incorporated directly with the feed device 36, 36' and/or the drive unit 40, 40' if desired.

In summary, the drilling system of the present invention for continuously in-situ drilling and flushing of the drill cuttings/dust operates in a manner to provide maximum drilling efficiency. The drill stem/bit 10, 11 or 10', 11' feeds into the drill hole in a controlled manner through the operation of the feed device 36, 36' as controlled in response to the programmable controller 33, 33'. A flushing mechanism 20-24; 20', 22', 50 provides bailing fluid into the drill passage 20, 20' and picks up the cuttings/dust in a highly efficient manner for disposal. By sensing the negative or positive gauge pressure through the transducer 30, 30', the controller 33, 33' regulates the advancement of the drill head 15. Because the controller is programmed to anticipate an overload condition in the transfer duct 22, 22' the drilling can proceed without deleterious downtime. In addition to the feed of the drill head 15, 15', the spinner 16, 16' of the drill stem/bit can be regulated by the controller 33, 33'.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for substantially continuously in-situ drilling and flushing of the drill cuttings and dust from the drill hole in the earth comprising:
   a drill stem having a bit;
   a drill head with a feed device for feeding said drill stem and bit into said earth as said bit is effective to form the drill hole;
   a flushing mechanism for removing said cuttings and dust from the hole adjacent said stem by bailing fluid flow so as to substantially eliminate airborne contamination;
   a transducer monitoring at least one parameter of the fluid flow and generating a signal indicative of the level of said parameter;
   a drive unit for said drill stem and bit for establishing a rate of driving; and
   a controller responsive to the signal from said transducer indicative of said flow parameter for substantially constantly regulating the rate of driving and feed of said drill stem and bit during both a normal and approaching overload condition,
   whereby said cuttings and dust are flushed in a controlled manner to substantially eliminate airborne contamination and provide substantially continuous and optimum drilling operation.

2. The apparatus of claim 1, wherein said flushing mechanism includes a vacuum generator and includes a transfer duct for conveying said flow to a remote location; said transducer being for sensing the negative gauge pressure in said duct and supplying a corresponding signal to said controller; said controller serving to regulate the rate of driving and feed of the drill stem dependent on the signal level indicative of the negative gauge pressure maintained in said duct.

3. The apparatus of claim 2, wherein said transducer is operative to sense the negative gauge pressure during conveying of said cuttings and dust by the vacuum through the flushing mechanism.

4. The apparatus of claim 3, wherein said vacuum generator includes a blower to generate a vacuum an the intake side, said duct serving to convey said cuttings and dust being coupled to the intake side thereof.

5. The apparatus of claim 1, wherein said parameter includes the gauge pressure of said fluid flow, said controller is programmable to allow adjustment of the approaching overload and reset threshold as determined by said gauge pressure for establishing the optimum rate of driving and feed for said drill stem.

6. The apparatus of claim 5, wherein said drive unit is rotary and said drill stem is adapted for rotary driving motion, said controller being operative for regulating the speed of rotary driving of the drill stem dependent on said signal.

7. The apparatus of claim 1, wherein said drill stem and bit are hollow to form a flow passage for said fluid and said cuttings and dust.

8. The apparatus of claim 7, wherein said flushing mechanism further includes a transfer duct for conveying the cuttings and dust from said passage to a remote location.

9. The apparatus of claim 8, wherein is provided a filter in said transfer duct for separating and to allow disposing of said cuttings and dust.

10. The apparatus of claim 1, wherein said flushing mechanism includes a hydraulic pump for forcing pressurized water through the mechanism to generate a slurry with said cuttings and dust for deposit outside said drill hole.

11. The method of substantially continuously in-situ drilling and flushing of the drill cuttings and dust from the drill hole in the earth comprising the steps of:

drilling said hole by driving a drill stem and bit in the earth;

feeding said drill stem and bit into said earth as said bit is effective to form the drill hole;

flushing said cuttings and dust from the hole adjacent said stem by bailing fluid flow so as to substantially eliminate airborne contamination;

monitoring through a transducer at least one parameter of the fluid flow; and substantially constantly regulating the rate of driving and feed of said drill stem and bit during both a normal and approaching overload condition;

whereby said cuttings and dust are flushed in a controlled manner to substantially eliminate airborne contamination and provide substantially continuous and optimum drilling operation.

12. The method of claim 11, wherein said flushing is by vacuum and the flow parameter being monitored is the negative gauge pressure; and said regulating the rate of driving and feed of the drill stem establishes the optimum driving and feed rate dependent on the signal level of negative gauge pressure from said transducer during the step of flushing said cuttings and dust.

13. The method of claim 12, wherein is further provided the step of adjusting the threshold of the negative gauge pressure establishing said optimum rate of driving and feed for said drill stem.

14. The method of claim 13, wherein the adjusting step is performed by setting the threshold level in the range of 10% to 20% above the normal level of negative gauge pressure and to reset the pressure level for the flushing step to normal within the range of 0.5–4 inches Hg. once the threat of the overload is past.

15. The method of claim 12, wherein the step of driving includes rotary driving of said stem and regulating the speed of rotary driving of the drill stem depending on said signal.

16. The method of claim 11, wherein the substantially constantly regulating step for the driving rate is performed by including slowing the feed of said drill stem to maintain substantially continuous and optimum driving rate of said drill stem.

17. The method of claim 16, wherein the substantially constantly regulating step includes stopping the feed of said drill stem during the last stage of the approaching overload condition and automatically returning the feed to optimum rate when the potential overload condition is past.

18. The method of claim 11, wherein the flushing step is performed by injection of hydraulic fluid through a transfer duct and a hollow flow passage in said drill stem and bit; and the monitoring step is performed by sensing the positive gauge pressure of said hydraulic fluid in said duct.

19. The method of claim 18, wherein said hydraulic fluid being injected for the flushing step includes water.

20. The method of claim 19, wherein during the drilling and flushing steps the cuttings and dust form a slurry that flows around the drill stem and bit and out of the drill hole.

* * * * *